No. 678,524. Patented July 16, 1901.
J. A. SMITH.
BEARING SPINDLE FOR VEHICLE AXLES.
(Application filed Jan. 3, 1901.)
(No Model.)
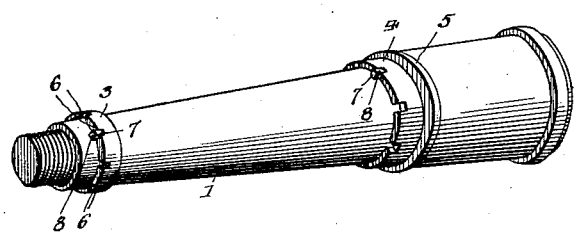
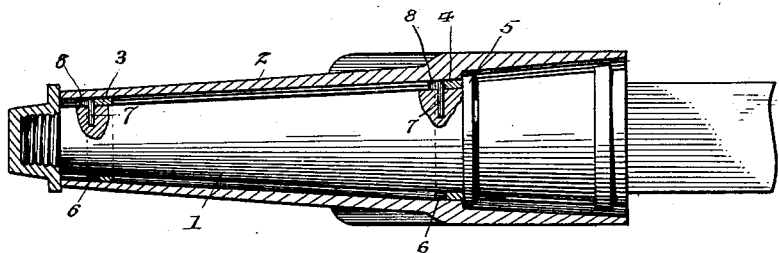
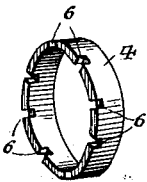

UNITED STATES PATENT OFFICE.

JOHN ALLEN SMITH, OF KINGSTON, ARKANSAS, ASSIGNOR OF ONE-FOURTH TO JOEL N. BUNCH, OF SAME PLACE.

BEARING-SPINDLE FOR VEHICLE-AXLES.

SPECIFICATION forming part of Letters Patent No. 678,524, dated July 16, 1901.

Application filed January 3, 1901. Serial No. 42,013. (No model.)

*To all whom it may concern:*

Be it known that I, JOHN ALLEN SMITH, a citizen of the United States, residing at Kingston, in the county of Madison and State of Arkansas, have invented a new and useful Bearing-Spindle, of which the following is a specification.

This invention relates to axle-spindles, and has for its object to provide improved means for preventing a spindle from becoming worn and also to reduce the extent of frictional surface between the spindle and the axle skein or box. It is furthermore designed to provide for adjusting the bearing-surface of the spindle, so as to compensate for wear thereon.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of an axle-spindle having the present invention applied thereto. Fig. 2 is a longitudinal sectional view with the axle skein or box fitted to the spindle. Fig. 3 is a detail perspective view of one of the adjustable bearing rings or bands.

Like characters of reference designate corresponding parts in all of the figures of the drawings.

Referring to the drawings, 1 designates an ordinary axle-spindle, and 2 the usual box or skein that is carried in the hub of a wheel and turns upon the spindle. Ordinarily this box or skein frictionally engages the spindle for the entire length thereof, thereby producing a large frictional area and causing the spindle to become worn. Moreover, it is the bottom or lower side of the spindle that becomes worn, and it is the essential object of this invention to conveniently compensate for the wear by the provision of a bearing member that is rotatably adjustable upon the spindle to bring an unworn portion thereof at the under side of the spindle when the bearing member has become worn at its under side.

As hereinbefore indicated, the present invention is designed to overcome these difficulties, and in carrying out this object there is provided a pair of bearing rings or bands 3 and 4, fixedly embracing the spindle at opposite ends thereof. The inner ring 4 abuts against the usual annular shoulder 5 on the spindle, so as to prevent inward displacement thereof, while the outer ring is adjacent to the outer smaller end of the spindle and is prevented from working inwardly by reason of the taper of the spindle. These rings are duplicates in form and mounting, and therefore a description of one is sufficient. Each ring has a comparatively broad and flat outer peripheral side and is provided in its outer edge, with respect to the inner end of the spindle, with a plurality of notches or recesses 6 for the reception of a fastening 7, which projects radially outward from the spindle, whereby the ring is held against being turned circumferentially upon the spindle.

As shown in Fig. 2 of the drawings, the outer end of each fastening is flush with or within the outer marginal side of the ring, and the skein or box bears upon the rings only, whereby the frictional surface between the box and the spindle is reduced to a minimum and a more easily-running bearing is provided.

It is designed to have each ring circumferentially adjustable upon the spindle, so as to present new surfaces for contact with the skein or box for taking up wear upon the ring, whereby the life of the spindle is materially extended, and to attain this object each fastening 7 fits loosely in a corresponding opening or socket formed in the top of the spindle, so as to be held in place when the wheel is removed from the spindle, and also has a laterally-projecting head 8, which is projected laterally outward beyond the notched outer edge of the ring, so that any suitable implement may be inserted beneath said head to remove the fastening from the spindle and the ring, whereby the latter is free to be turned circumferentially upon the spindle, so as to bring a new or unworn part of the ring at the lower side of the spindle, after which the fastening is replaced in the socket in the spindle and also within a corresponding notch in the ring, whereby the latter is locked against accidental movement or displacement.

From the foregoing description it will be apparent that the spindle may be made of comparatively soft material, so as to strengthen the same, while the bearing rings or bands are made of hard material, so as to withstand the wear of the skein or box, which turns thereon. Any desired number of notches may be formed in the ring, so as to secure a corresponding number of adjustments thereof, and new rings may be substituted when the old rings have become entirely worn, whereby the life of the spindle is extended and the bearing is maintained in its original perfection.

What is claimed is—

1. A bearing-spindle, having one or more rotatably-adjustable bearing rings or bands, each ring having a plurality of openings, and a detachable fastening carried by the spindle and arranged for adjustable engagements with corresponding openings in the ring.

2. A bearing-spindle, having one or more rotatably-adjustable bearing rings or bands, each ring having a plurality of edge notches, and a detachable fastening carried by the spindle, and having a laterally-extending head adjustably received within the notches, one end of the head being projected laterally outward beyond the adjacent notched edge of the ring.

3. The combination with an outwardly-tapered bearing-spindle, of a rotatably-adjustable bearing ring or band having an outer notched edge, and a detachable fastening carried by the spindle and arranged for adjustable engagement with the notches in the outer edge of the ring or band.

4. As a new article of manufacture, a bearing ring or band, having its inner margin constructed to snugly embrace a bearing-spindle and for rotatable adjustment thereon, the outer margin being constructed to form a bearing-surface for a rotatable hub, and one marginal edge of the ring or band having notches formed therein and constructed for the detachable reception of a spindle-engaging fastening.

In testimony that I claim the foregoing as my own I have hereto affixed my signature in the presence of two witnesses.

JOHN ALLEN SMITH.

Witnesses:
W. A. HILL,
E. F. SHINN.